United States Patent
Lee et al.

(10) Patent No.: US 12,450,545 B2
(45) Date of Patent: Oct. 21, 2025

(54) LOGISTICS TRANSPORT SYSTEM AND LOGISTICS TRANSPORT METHOD INCLUDING SAME

(71) Applicants: Hyundai Motor Company, Seoul (KR); Kia Corporation, Seoul (KR)

(72) Inventors: Sang Heon Lee, Seoul (KR); Dong Eun Cha, Hwaseong-Si (KR); Jin Ho Hwang, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 679 days.

(21) Appl. No.: 17/869,379

(22) Filed: Jul. 20, 2022

(65) Prior Publication Data

US 2023/0110162 A1 Apr. 13, 2023

(30) Foreign Application Priority Data

Oct. 8, 2021 (KR) .................. 10-2021-0133558

(51) Int. Cl.
*G06Q 10/083* (2024.01)
*B60P 3/00* (2006.01)
*G06Q 10/047* (2023.01)

(52) U.S. Cl.
CPC ......... *G06Q 10/083* (2013.01); *G06Q 10/047* (2013.01); *B60P 3/007* (2013.01)

(58) Field of Classification Search
CPC .... G06Q 10/08; G06Q 10/083; G06Q 10/047; G06Q 10/836; G06Q 10/08355; B60P 3/007; G05D 1/0225; G05D 1/0297; G05D 1/644; G05D 1/648; G05D 2105/28; G05D 2107/80
See application file for complete search history.

(56) References Cited

U.S. PATENT DOCUMENTS

| 10,241,516 B1* | 3/2019 | Brady ................ G06Q 10/0832 |
| 2015/0006005 A1* | 1/2015 | Yu ........................ G05D 1/667 |
| | | 701/22 |
| 2018/0356823 A1* | 12/2018 | Cooper .................. G06Q 50/40 |
| 2020/0398690 A1 | 12/2020 | Lee |
| 2021/0129870 A1 | 5/2021 | Jung |

FOREIGN PATENT DOCUMENTS

| KR | 10-2000-0037356 | 7/2000 |
| KR | 10-2043801 | 11/2019 |

* cited by examiner

*Primary Examiner* — Timothy R Waggoner
(74) *Attorney, Agent, or Firm* — Morgan Lewis & Bockius LLP (57) ABSTRACT

A logistics transport system includes individual transport cart of traveling by first driving unit and transporting a cargo to a delivery position; a transport vehicle of traveling by second driving unit and driving to the delivery position in loading the individual transport cart thereon to deliver a cargo or driving to an intermediate base point and then separating the individual transport cart therefrom at the intermediate base point; and a control unit configured to, when the cargo is delivered from a terminal at which the cargo is loaded to the delivery position, control the individual transport cart to deliver the cargo from the terminal to the delivery position by the individual transport cart, or control the transport vehicle to deliver the individual transport cart to the intermediate base point and then control the individual transport cart to deliver the cargo from the intermediate base point to the delivery position.

20 Claims, 3 Drawing Sheets

LOGISTICS TRANSPORT SYSTEM AND LOGISTICS TRANSPORT METHOD INCLUDING SAME

CROSS-REFERENCE TO RELATED APPLICATION(S)

The present application claims priority to Korean Patent Application No. 10-2021-0133558, filed on Oct. 8, 2021, the entire contents of which is incorporated herein for all purposes by this reference.

BACKGROUND OF THE PRESENT DISCLOSURE

Field of the Present Disclosure

The present disclosure relates to a logistics transport system and a logistics transport method including the same, and more particularly, to a technology for transporting cargo through autonomous driving.

Description of Related Art

Development of electronic engineering and communication engineering has been followed by rapid development of network technologies capable of integrating a large number of computers spatially far from each other.

Such development of network technologies has enabled users who have accessed a network to search and simultaneously use pieces of data that have been input through terminals temporally/spatially far from each other. Particularly, in connection with transporting cargo, it has become possible to strike a cargo transport contract through such a network, reducing costs and ensuing efficient use of time.

Conventionally, delivery staff need to drive vehicles to transport cargo, but in line with development of autonomous vehicle driving technologies, there is a demand for a system for transporting cargo through autonomous vehicles.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system, wherein cargos are delivered to customers by autonomous driving of multiple individual transport carts configured to deliver cargos to customers and a transport vehicle configured to transfer the individual transport carts to an intermediate base point.

A logistics transport system according to the present disclosure includes: an individual transport cart on which a cargo is loaded and which is configured for traveling by a first driving unit and transports the cargo to a delivery position; a transport vehicle to or from which the individual transport cart is loaded or unloaded and which is configured for traveling by a second driving unit and travels to the delivery position in a state of loading the individual transport cart thereon to deliver the cargo or travels to an intermediate base point and then separates the individual transport cart therefrom at the intermediate base point; and a control unit configured to, when the cargo is delivered from a terminal at which the cargo is loaded to the delivery position, control the individual transport cart to deliver the cargo from the terminal to the delivery position by the individual transport cart, or control the transport vehicle to deliver the individual transport cart to the intermediate base point and then control the individual transport cart to deliver the cargo from the intermediate base point to the delivery position.

The logistics transport system may further include an input unit through which the delivery position of a cargo is input, and a calculation unit configured to determine a distance between the terminal and the delivery position input through the input unit, and the control unit may control the individual transport cart or the transport vehicle based on the distance between the delivery position and the terminal determined by the calculation unit.

The control unit may control, when the distance between the terminal and the delivery position determined by the calculation unit is less than a predetermined distance, the individual transport cart to transport the cargo from the terminal to the delivery position.

The control unit may control, when the distance between the terminal and the delivery position determined by the calculation unit is greater than or equal to a predetermined distance, the transport vehicle to move the cargo from the terminal to the intermediate base point and controls the individual transport cart to transport the cargo from the intermediate base point to the delivery position.

The control unit may couple the individual transport cart to the transport vehicle moving to the intermediate base point by grouping only individual transport carts including delivery positions adjacent to the intermediate base point to be coupled to the delivery vehicle.

The logistics transport system may further include a path configuration unit configured to determine a path of the individual transport cart from the terminal or the intermediate base point to the delivery position based on the delivery position input through the input unit, and the control unit may control travel of the individual transport cart based on the path determined by the path configuration unit.

The logistics transport system may further include a transceiver unit configured to transmit information of the path determined by the path configuration unit to the individual transport cart and the transport vehicle and receive driving information of the individual transport cart and the transport vehicle.

The transport vehicle and the individual transport cart may be configured for autonomous driving according to control of the control unit.

The control unit may control the individual transport cart to return to the intermediate base point or the terminal when transport of the cargo to the delivery position is completed or an error occurs in the first driving unit during transport.

The control unit may control the individual transport cart having returned to the intermediate base point to be received in the transport vehicle having moved to the intermediate base point and separated from the individual transport cart to return to the terminal.

The control unit may control the individual transport cart to be parked at an outermost portion of a road when an abnormal operation of the individual transport cart is identified and moves the transport vehicle to a position of the parked individual transport cart to retrieve the parked individual transport cart therefrom.

A logistics transport method including the logistics transport system according to an exemplary embodiment of the present disclosure, includes controlling, when a cargo is delivered from a terminal at which the cargo is loaded to a delivery position, an individual transport cart to deliver the cargo from the terminal to the delivery position by the individual transport cart, or controlling a transport vehicle to deliver the individual transport cart to an intermediate base point and then controlling the individual transport cart to deliver the cargo from the intermediate base point to the delivery position.

The logistics transport method may further include inputting a delivery position of a cargo, and determining a distance between the terminal and the delivery position input through the inputting, and in the controlling, the individual transport cart or the transport vehicle may be controlled based on the distance between the delivery position and the terminal determined in the determining.

In the controlling, when the distance between the terminal and the delivery position determined in the determining is less than a predetermined distance, the individual transport cart may be controlled to transport a cargo from the terminal to the delivery position.

In the controlling, when the distance between the terminal and the delivery position determined in the determining is greater than or equal to a predetermined distance, the transport vehicle may be controlled to move a cargo from the terminal to the intermediate base point and the individual transport cart may be controlled to transport the cargo from the intermediate base point to the delivery position.

The logistics transport method may further include determining a path of the individual transport cart from the terminal or the intermediate base point to the delivery position based on the delivery position input through the inputting, and in the controlling, travel of the individual transport cart may be controlled based on the path determined in the determining the path.

The logistics transport method may further include diagnosing an abnormality of a first driving unit in the controlling, and in the controlling, the individual transport cart may be controlled to move to an adjacent terminal or an adjacent intermediate base point when the abnormality of the first driving unit occurs in the diagnosing.

A logistics transport system and a logistics transport method according to the present disclosure are advantageous in that an autonomously driven individual transport cart and a transport vehicle configured to transport the individual transport cart to an intermediate base point are provided so that the individual transport cart is alone controlled according to a cargo delivery position to deliver a cargo from a terminal to the delivery position, or the individual transport cart is transported to an intermediate base point through the transport vehicle, and the cargo is delivered from the intermediate base point to the delivery position, effectively delivering the carto through autonomous driving technology, and improving the cargo delivery speed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure included in the specification or application is provided merely for describing the exemplary embodiment according to an exemplary embodiment of the present disclosure. Therefore, the exemplary embodiments of the present disclosure may be implemented in various forms, and the present disclosure should not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the disclosed exemplary embodiments of the present disclosure, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. In the respective drawings, identical or like reference signs denote identical or like components.

A control unit 10, a calculation unit 20, an input unit 30, a path configuration unit 40, and transceiver unit 50 according to an exemplary embodiment of the present disclosure may be implemented through a non-volatile memory configured to store an algorithm configured to control operations of various elements of a vehicle or data related to software commands for running the algorithm, and a processor configured to perform operations to be described below by use of data stored in the corresponding memory. Here, the memory and the processor may be implemented as separate chips. Alternatively, the memory and the processor may be implemented as an integrated single chip. The processor may have a form of one or more processors.

Figure 1:
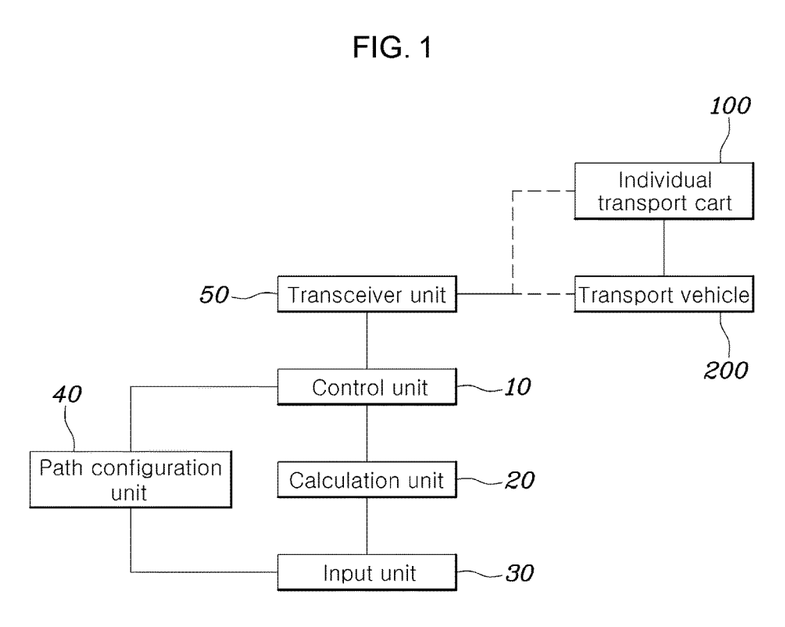
FIG. 1 is a diagram illustrating a logistics transport system according to an exemplary embodiment of the present disclosure.
Figure 2:
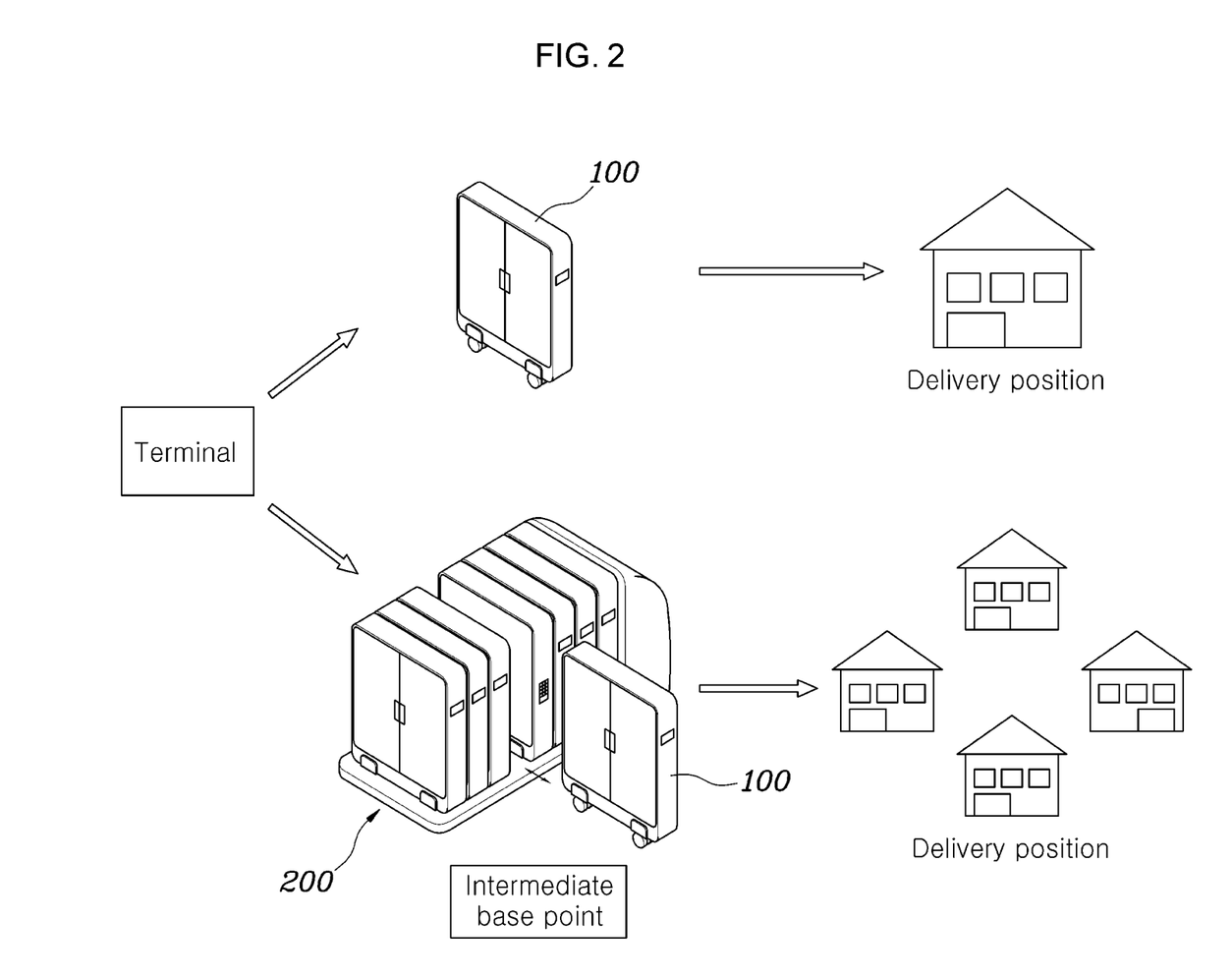
FIG. 2 is a diagram illustrating movements of a transport vehicle and individual transport carts of a logistics transport system according to an exemplary embodiment of the present disclosure.
Figure 3:
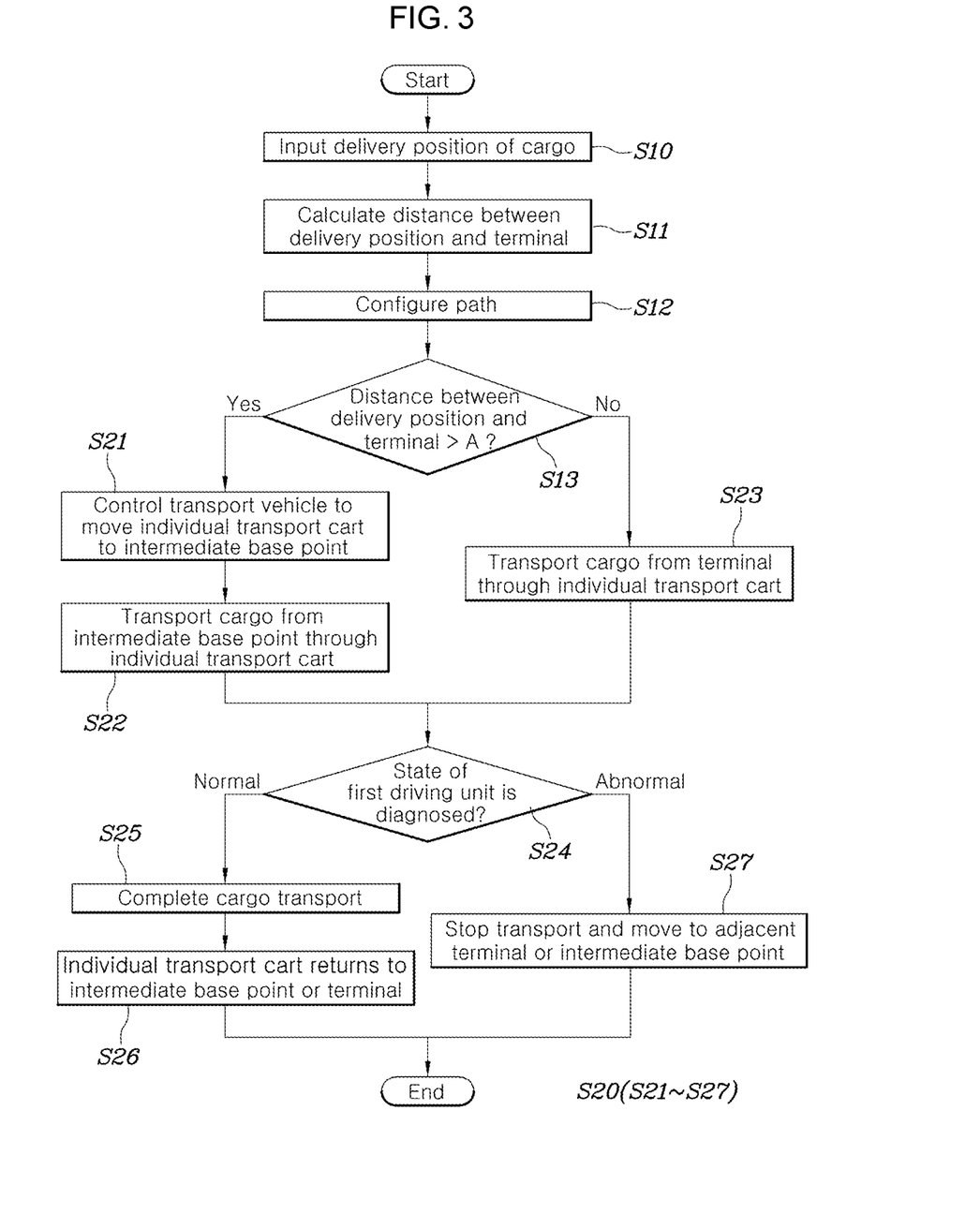
FIG. 3 is a flowchart illustrating a logistics transport method according to an exemplary embodiment of the present disclosure.

FIG. 1 shows a block diagram illustrating a logistics transport system according to an exemplary embodiment of the present disclosure, FIG. 2 shows a drawing illustrating a traveling of a transport vehicle 200 and individual transport carts 100 of a logistics transport system according to an exemplary embodiment of the present disclosure, and FIG. 3 shows a flowchart illustrating a method for logistics transport according to an exemplary embodiment of the present disclosure.

The logistics transport system according to the present disclosure includes an individual transport cart 100 on which a cargo is loaded and which is configured for traveling through a first driving unit and transports a cargo to a delivery position, a transport vehicle 200 to or from which a predetermined number of individual transport carts 100 are loaded or unloaded and which is configured for traveling through a second driving unit and drives to a delivery position in a state of loading the individual transport cart 100 thereon to deliver a cargo or drives to an intermediate base point and then separates the individual transport cart 100 therefrom at the intermediate base point, and a control unit 10 configured to, when a cargo is delivered from a terminal at which the cargo is loaded to a delivery position, control each individual transport cart 100 to deliver the cargo from the terminal to the delivery position by the individual transport cart 100, or control the transport vehicle 200 to deliver the individual transport carts 100 to the intermediate base point and then control each individual transport cart 100 to deliver the cargo from the intermediate base point to the delivery position.

As shown in FIG. 1 to FIG. 2, each individual transport cart 100 may separately travel by including the first driving unit and receive a cargo loaded thereon.

The cargo described herein is referred to an article to be delivered such as a parcel item and the cargo may be changed to various types.

Furthermore, the individual transport carts 100 may include a cooling and heating device configured to set a temperature required for a cargo according to a type of the cargo. Accordingly, the individual transport carts 100 are configured for setting a temperature of an inside thereof to deliver food requiring cold or freezing storage, and configured for warm storage as well as cold or freezing storage to deliver a delivery article requiring warm storage at a required temperature to a customer.

Multiple individual transport carts 100 are received in the terminal, an operator may load a cargo on each individual transport cart 100 at the terminal, and the individual transport carts 100 may travel according to the control of the control unit 10 to deliver the cargo positioned at the terminal to a customer.

As shown in FIG. 2, the transport vehicle 200 may have multiple individual transport carts 100 combined with each other or separated from each other, and deliver the multiple individual transport carts 100 to a preconfigured destination.

The control unit 10 may control each individual transport cart 100 to move from the terminal to a delivery position according to the delivery position of a cargo, or control the multiple individual transport carts 100 having a cargo loaded thereon to be coupled to the transport vehicle 200 at the terminal, move the transport vehicle 200 including the plurality of individual transport carts 100 coupled thereto to an intermediate base point, then separate the transport vehicle 200 and the multiple individual transport carts 100 at the intermediate base point, and move each individual transport cart 100 from the intermediate base point to the delivery position to deliver the cargo to a customers.

The control unit 10 may control only each individual transport carts 100 to deliver a cargo when a distance between the terminal and the delivery position is short, and may move the individual transport carts 100 through the transport vehicle 200 including multiple individual transport carts 100 coupled thereto to the intermediate base point and control each individual transport cart 100 from the intermediate base point to deliver a cargo to deliver the cargo to a customer when a distance between the terminal and the delivery position is long.

Through this, the cargo may be automatically delivered through the transport vehicle 200 and the individual transport carts 100 and an effect of efficient delivery may be achieved by controlling the transport vehicle 200 and the individual transport carts 100 according to delivery distances.

The transport vehicle 200 and the individual transport carts 100 may autonomously drive according to control of the control unit 10.

The transport vehicle 200 and the individual transport carts 100 to which an automatic driving system is applied may drive in a driving direction and at a driving speed controlled by the control unit 10 so that each individual transport cart 100 drives from the terminal to the delivery position or is separated from the transport vehicle 200 and then drives to the delivery position, or the transport vehicle 200 is moved from the terminal to the intermediate base point through the control of the control unit 10.

An input unit 30 through which a delivery position of a cargo is input; and a calculation unit 20 configured to determine a distance between the terminal and the delivery position input through the input unit 30 may be further included, and the control unit 10 may control the individual transport carts 100 or the transport vehicle 200 based on the distance between the delivery position and the terminal determined by the calculation unit 20.

An operator may input a delivery position of a cargo loaded on the individual transport carts 100 through the input unit 30, and the calculation unit 20 may determine a distance between the terminal and the delivery position input through the input unit 30.

Based on the distance between the delivery position and the terminal determined by the calculation unit 20, the control unit 10 may determine whether a cargo is delivered from the terminal to the delivery position only using each individual transport cart 100, or multiple individual transport carts 100 are delivered to the intermediate base point by the transport vehicle 200 and then a cargo is delivered from the intermediate base point to the delivery position by each individual transport cart 100.

Furthermore, when it is determined whether the transport vehicle 200 and the individual transport carts 100 operate according to a distance, the control unit 10 may operate the transport vehicle 200 and the individual transport carts 100 to start a cargo delivery.

When a distance between the terminal and the delivery position determined by the calculation unit 20 is less than a preconfigured distance, the control unit 10 may control the individual transport carts 100 to transport a cargo from the terminal to the delivery position.

When a distance between the terminal and the delivery position determined by the calculation unit 20 is less than a preconfigured distance, the control unit 10 may control only the individual transport carts 100 to transport a cargo from the terminal to the delivery position.

Through this, compared to the conventional cargo transport system which has an unnecessary process of moving all cargoes from a terminal to an intermediate base point and then from the intermediate base point to a delivery position, the logistics transport system of the present disclosure has an effect that when the delivery position is close to the terminal at a distance less than a preconfigured distance, each individual transport cart 100 delivers a cargo to the delivery position without stopping at the intermediate base point and thus rapid cargo delivery may be achieved.

When a distance between the terminal and the delivery position determined by the calculation unit 20 is greater than or equal to a preconfigured distance, the control unit 10 may control the transport vehicle 200 to move a cargo from the terminal to the intermediate base point and control each individual transport cart 100 to transport the cargo from the intermediate base point to the delivery position.

When a distance between the terminal and the delivery position determined by the calculation unit 20 is greater than or equal to a preconfigured distance, the control unit 10 may control the individual transport carts 100 and the transport vehicle 200 to couple the individual transport carts 100 having a cargo loaded thereon to the transport vehicle 200 and transport the cargo from the terminal to the intermediate base point by the transport vehicle 200.

The control unit 10 couples the multiple individual transport carts 100 to the transport vehicle 200 by grouping only multiple individual transport carts 100 including delivery positions adjacent to the intermediate base point to be coupled to a delivery vehicle.

Through this, the multiple individual transport carts 100 are moved to the intermediate base point by the transport vehicle 200 and the multiple individual transport carts 100 deliver cargoes to each delivery position, thus achieving effects of reducing battery or fuel consumption of the multiple individual transport carts 100 and an efficient delivery progress.

A path configuration unit 40 configured to determine a path of each individual transport cart 100 from the terminal or the intermediate base point to the delivery position based on the delivery position input through the input unit 30 may be further included and the control unit 10 may control the travel of the individual transport carts 100 based on the path determined by the path configuration unit 40.

To control the autonomously driving individual transport cart 100 and transport vehicle 200, the path configuration unit 40 may determine an optimum travel path of each individual transport cart 100 from the terminal to the delivery position, from the terminal to the intermediate base point, or from the intermediate base point to the delivery position, and the control unit 10 may control the individual transport carts 100 and the transport vehicle 200 to travel along the determined path.

Through this, the effect of rapid control of traveling of the individual transport cart 100 and the transport vehicle 200 may be achieved.

A transceiver unit 50 configured to transmit the path determined by the path configuration unit 40 to each individual transport cart 100 and the transport vehicle 200 and receive driving information of the individual transport cart 100 and the transport vehicle 200 may be further included.

Each individual transport cart 100 and transport vehicle 200 is provided with a wireless communication function to communicate with the transceiver unit 50, and the transceiver unit 50 may transmit the path determined by the path configuration unit 40 to each individual transport cart 100 and the transport vehicle 200 so that the individual transport carts 100 and the transport vehicle 200 may drive through autonomous traveling, and receive driving information on traveling of the individual transport carts 100 and the transport vehicle 200 through wireless communication.

The control unit 10 may control each individual transport cart 100 to return to the intermediate base point or the terminal when the cargo transport to the delivery position is completed or an error occurs in the first driving unit during transport.

The transceiver unit 50 may receive driving information of the individual transport carts 100, and the control unit 10 may end the transport by controlling the individual transport carts 100 to return to an adjacent intermediate base point or an adjacent terminal when completing the cargo delivery.

The control unit 10 may cause the individual transport carts 100 to move to the terminal immediately after the deliver is completed when a distance between the terminal and the delivery position is less than a preconfigured distance to enable collecting of the individual transport carts 100.

Furthermore, when a distance between the terminal and the delivery position is more than or equal to a preconfigured distance, the individual transport carts 100 may return to the intermediate base point upon completing the delivery, and be coupled to the transport vehicle when the transport vehicle moves to the intermediate base point to move to the terminal.

Here, multiple individual transport carts 100 may be gathered at the intermediated position and multiple individual transport carts 100 may be coupled to the transport vehicle 200 so that the individual transport carts 100 may be efficiently collected.

Furthermore, when expected not to normally operate due to an accident during a cargo delivery or insufficiency of a battery, the individual transport carts 100 may be controlled to stop the delivery and return to an adjacent intermediate base point or an adjacent terminal to end the transport.

The individual transport carts 100 and the transport vehicle 200 may operate through a battery, and the control unit 10 may configure whether the individual transport carts 100 and the transport vehicle 200 operate according to a state of the battery and also control the individual transport carts 100 to return when the delivery is determined impossible after checking a reduction amount of the battery.

Through this, the effect of securing the retrieval of the individual transport carts 100 and the maintenance of the individual transport carts 100 may be achieved.

The control unit 10 may control the individual transport carts 100 having returned to the intermediate base point to be received in the transport vehicle 200 which has moved to the intermediate base point and been separated from the individual transport carts 100 and to return to the terminal.

The control unit 10 may control the individual transport carts 100 having departed from the intermediate base point and completed the delivery to return to the intermediate base point and the individual transport carts 100 having returned to the intermediate base point to be coupled to the transport vehicle 200 again and then return to the terminal by the transport vehicle 200.

Furthermore, the control unit 10 may control the individual transport carts 100 having departed from the terminal and completed the delivery to return to the terminal.

Through this, the effect of efficiently retrieving the individual transport carts 100 having completed the delivery may be achieved.

The control unit 10 may control each individual transport carts 100 to be parked at outermost portion of a road when an abnormal operation of the individual transport cart 100 is identified and move the transport vehicle 200 to a position of the parked individual transport cart 100 to retrieve the individual transport cart 100.

When the control unit 10 identifies the abnormality of each individual transport cart 100 while driving, the control unit 10 may control the individual transport cart 100 to park at the outermost portion of a road.

Through this, the effect of preventing the individual transport carts 100 from stopping in a road and blocking the road may be achieved.

Furthermore, the parked individual transport cart 100 may be retrieved by moving the transport vehicle 200 to the position of the parked individual transport cart 100, and may be moved to the terminal or the intermediate base point so that the abnormally operating individual transport cart 100 may be repaired.

In FIG. 3, a logistics transport method including the logistics transport system according to an exemplary embodiment of the present disclosure includes an operation of controlling, when a cargo is delivered from a terminal at which the cargo is loaded to a delivery position, individual transport carts 100 to deliver the cargo from the terminal to the delivery position by the individual transport carts 100, or controlling a transport vehicle 200 to deliver the individual transport carts 100 to the intermediate base point and then controlling the individual transport carts 100 to deliver the cargo from the intermediate base point to the delivery position (S20).

The logistics transport method further includes an operation of inputting a delivery position of a cargo (S10); and an operation of determining (S11) a distance between the terminal and the delivery position input through operation of inputting the delivery position (S10), and in the operation of controlling (S20), the individual transport carts 100 or the transport vehicle 200 may be controlled based on the distance between the delivery position and the terminal determined in the operation of determining (S11).

When a distance between the terminal and the delivery position determined in the operation of determining (S11) is less than a preconfigured distance, in the operation of controlling (S20), the individual transport carts 100 may be controlled to transport a cargo from the terminal to the delivery position (S23).

When a distance between the terminal and the delivery position determined in the operation of determining (S11) is greater than or equal to a preconfigured distance, in the operation of controlling (S20), the transport vehicle 200 may be controlled to move a cargo from the terminal to the intermediate base point (S21) and the individual transport carts 100 may be controlled to transport the cargo from the intermediate base point to the delivery position (S22).

Furthermore, the operation of controlling (S20) further includes an operation of moving an individual transport cart having completed a cargo delivery (S25) to an adjacent intermediate base point or terminal (S26).

An operation of determining (S12) a path of each individual transport cart 100 from the terminal or the intermediate base point to the delivery position based on the delivery position input in the operation of inputting (S10) may be further included and in the operation of controlling (S20), the travel of each individual transport cart 100 may be controlled based on the path determined in the operation of determining a path (S12).

The operation of controlling (S20) further includes an operation of diagnosing an abnormality of a first driving unit (S24), and in the operation of controlling (S20), each individual transport cart 100 may be controlled to move to an adjacent terminal or an adjacent intermediate base point when an abnormality of the first driving unit occurs in the operation of diagnosing (S27).

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A logistics transport system comprising:
an individual transport cart on which a cargo is loaded and which is configured for traveling by a first driving unit and transports the cargo to a delivery position;
a transport vehicle to or from which the individual transport cart is loaded or unloaded and which is configured for traveling by a second driving unit and travels to the delivery position in a state of loading the individual transport cart thereon to deliver the cargo or travels to an intermediate base point and then separates the individual transport cart therefrom at the intermediate base point; and
a control unit configured to, when the cargo is delivered from a terminal at which the cargo is loaded to the delivery position, control the individual transport cart to deliver the cargo from the terminal to the delivery position by the individual transport cart, or control the transport vehicle to deliver the individual transport cart to the intermediate base point and then control the individual transport cart to deliver the cargo from the intermediate base point to the delivery position,
wherein the control unit is configured to stop delivery and control the individual transport cart to return to the intermediate base point or the terminal when an error occurs in the first driving unit during the transport.

2. The logistics transport system of claim 1, further including:
an input unit through which the delivery position of the cargo is input; and
a calculation unit configured to determine a distance between the terminal and the delivery position input through the input unit,
wherein the control unit is configured to control the individual transport cart or the transport vehicle based on the distance between the delivery position and the terminal determined by the calculation unit.

3. The logistics transport system of claim 2, wherein the control unit is configured to control, when the distance between the terminal and the delivery position determined by the calculation unit is less than a predetermined distance, the individual transport cart to transport the cargo from the terminal to the delivery position.

4. The logistics transport system of claim 2, wherein the control unit is configured to control, when the distance between the terminal and the delivery position determined by the calculation unit is greater than or equal to a predetermined distance, the transport vehicle to move the cargo from the terminal to the intermediate base point and configured to control the individual transport cart to transport the cargo from the intermediate base point to the delivery position.

5. The logistics transport system of claim 4, wherein the control unit is configured to couple individual transport carts to the transport vehicle moving to the intermediate base point by grouping only individual transport carts including delivery positions adjacent to the intermediate base point to be coupled to the delivery vehicle.

6. The logistics transport system of claim 2, further including:
a path configuration unit configured to determine a path of the individual transport cart from the terminal or the intermediate base point to the delivery position based on the delivery position input through the input unit,
wherein the control unit is configured to control travel of the individual transport cart based on the path determined by the path configuration unit.

7. The logistics transport system of claim 6, further including:
a transceiver unit configured to transmit information of the path determined by the path configuration unit to the individual transport cart and the transport vehicle, and configured to receive driving information of the individual transport cart and the transport vehicle.

8. The logistics transport system of claim 1, wherein the transport vehicle and the individual transport cart are configured for autonomous driving according to control of the control unit.

9. The logistics transport system of claim 1, wherein the control unit is further configured to control the individual transport cart to return to the intermediate base point or the terminal when transport of the cargo to the delivery position is completed during the transport.

10. The logistics transport system of claim 1, wherein the control unit is configured to control the individual transport cart having returned to the intermediate base point to be received in the transport vehicle having moved to the intermediate base point and separated from the individual transport cart to return to the terminal.

11. The logistics transport system of claim 1, wherein the control unit is configured to control the individual transport cart to be parked at an outermost portion of a road when an abnormal operation of the individual transport cart is identified and is configured to move the transport vehicle to a position of the parked individual transport cart to retrieve the parked individual transport cart therefrom.

12. A logistics transport method including the logistics transport system of claim 1, the method comprising:
controlling, by the control unit, when the cargo is delivered from the terminal at which the cargo is loaded to the delivery position, the individual transport cart to deliver the cargo from the terminal to the delivery position by the individual transport cart, or controlling the transport vehicle to deliver the individual transport cart to the intermediate base point and then controlling the individual transport cart to deliver the cargo from the intermediate base point to the delivery position.

13. The logistics transport method of claim 12, further including:
receiving the delivery position of the cargo through an input unit; and
determining a distance between the terminal and the delivery position input through the receiving,
wherein in the controlling, the individual transport cart or the transport vehicle is controlled based on the distance between the delivery position and the terminal determined in the determining.

14. The logistics transport method of claim 13, wherein in the controlling, when the distance between the terminal and the delivery position determined in the determining is less than a predetermined distance, the individual transport cart is controlled, by the control unit, to transport the cargo from the terminal to the delivery position.

15. The logistics transport method of claim 13, wherein in the controlling, when the distance between the terminal and the delivery position determined in the determining is greater than or equal to a predetermined distance, the transport vehicle is controlled, by the control unit, to move the cargo from the terminal to the intermediate base point and the individual transport cart is controlled, by the control unit, to transport the cargo from the intermediate base point to the delivery position.

16. The logistics transport method of claim 13, further including:
   determining, by a path configuration unit, a path of the individual transport cart from the terminal or the intermediate base point to the delivery position based on the delivery position input through the receiving,
   wherein in the controlling, travel of the individual transport cart is controlled, by the control unit, based on the path determined in the determining the path.

17. The logistics transport method of claim 12, further including:
   diagnosing, by the control unit, an abnormality of the first driving unit in the controlling,
   wherein in the controlling, the individual transport cart is controlled, by the control unit, to move to an adjacent terminal or an adjacent intermediate base point when the abnormality of the first driving unit occurs in the diagnosing.

18. The logistics transport method of claim 12, further including:
   controlling, by the control unit, the individual transport cart to return to the intermediate base point or the terminal when transport of the cargo to the delivery position is completed or an error occurs in the first driving unit during the transport.

19. The logistics transport method of claim 18, further including:
   controlling, by the control unit, the individual transport cart having returned to the intermediate base point to be received in the transport vehicle having moved to the intermediate base point and separated from the individual transport cart to return to the terminal.

20. The logistics transport method of claim 12, further including:
   controlling, by the control unit, the individual transport cart to be parked at an outermost portion of a road when an abnormal operation of the individual transport cart is identified and moving, by the control unit, the transport vehicle to a position of the parked individual transport cart to retrieve the parked individual transport cart therefrom.

* * * * *